US009547841B2

(12) United States Patent
Birsan et al.

(10) Patent No.: US 9,547,841 B2
(45) Date of Patent: Jan. 17, 2017

(54) DERIVING OVERLAY INFORMATION FROM A USER INPUT FOR A BASE MESSAGE SCHEMA ASSOCIATED WITH A NODE IN A MESSAGE FLOW

(75) Inventors: Dorian Birsan, Toronto (CA); Allen V. Chan, Markham (CA); Christopher F. Markes, Winchester (GB); Robert W. Phippen, Romsey (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1963 days.

(21) Appl. No.: 12/241,444

(22) Filed: Sep. 30, 2008

(65) Prior Publication Data
US 2009/0164593 A1 Jun. 25, 2009

(30) Foreign Application Priority Data
Dec. 21, 2007 (EP) .................................... 07150350

(51) Int. Cl.
*G06F 15/16* (2006.01)
*G06Q 10/10* (2012.01)
(52) U.S. Cl.
CPC .................................. *G06Q 10/107* (2013.01)
(58) Field of Classification Search
CPC ............. G06F 17/30292; H04L 9/0855; H04L 12/40195; H04L 5/06
USPC .......................... 709/206, 200, 224, 217, 203
See application file for complete search history.

(56) References Cited

U.S. PATENT DOCUMENTS

| | | | |
|---|---|---|---|
| 6,077,313 A | 6/2000 | Ruf | |
| 6,636,855 B2 | 10/2003 | Holloway et al. | |
| 7,007,033 B1* | 2/2006 | Rothschiller | ....... G06F 17/2247 |
| 7,281,018 B1* | 10/2007 | Begun et al. | |
| 8,135,755 B2* | 3/2012 | Selca | ................ G06F 17/30292 707/803 |
| 2002/0152244 A1* | 10/2002 | Dean et al. | .................... 707/530 |
| 2002/0194227 A1* | 12/2002 | Day et al. | ...................... 707/523 |
| 2003/0046282 A1* | 3/2003 | Carlson | ...................... G06F 8/36 |
| 2003/0050931 A1* | 3/2003 | Harman et al. | ............... 707/100 |
| 2003/0154154 A1* | 8/2003 | Sayal et al. | ...................... 705/37 |
| 2003/0182452 A1* | 9/2003 | Upton | ............................ 709/246 |
| 2004/0030993 A1* | 2/2004 | Hong Huey | ............. G06F 8/38 715/229 |
| 2004/0107401 A1* | 6/2004 | Sung et al. | ................. 715/500.1 |
| 2004/0172584 A1* | 9/2004 | Jones et al. | .................... 715/500 |
| 2005/0066317 A1 | 3/2005 | Alda et al. | |
| 2005/0091290 A1* | 4/2005 | Cameron et al. | ............. 707/201 |
| 2005/0132276 A1* | 6/2005 | Panditharadhya et al. | ... 715/513 |
| 2005/0209876 A1* | 9/2005 | Kennis | .............. G06F 17/30569 726/1 |

(Continued)

*Primary Examiner* — El Hadji Sall
(74) *Attorney, Agent, or Firm* — Patents on Demand P.A.; Brian K. Buchheit; Scott M. Garrett

(57) ABSTRACT

There is disclosed a method, apparatus and computer program for deriving overlay information from a user input for a base message schema associated with a node in a message flow. The base message schema is presented to the user and has at least one variable portion. A user selection of a variable portion of the base schema is received. The user is then provided with possible overlay schema information for the selected variable portion. A user selection of the schema to be overlaid on the selected variable portion is received. The selected overlay schema is associated with the base schema.

19 Claims, 8 Drawing Sheets

(56) References Cited

U.S. PATENT DOCUMENTS

| | | |
|---|---|---|
| 2005/0246629 A1* | 11/2005 | Hu .............................. 715/513 |
| 2005/0262049 A1* | 11/2005 | Somppi ........................... 707/3 |
| 2005/0262440 A1* | 11/2005 | Stanciu et al. ............... 715/523 |
| 2006/0074736 A1 | 4/2006 | Shukla et al. |
| 2006/0090129 A1* | 4/2006 | Collie et al. ................. 715/513 |
| 2006/0101068 A1* | 5/2006 | Stuhec et al. ............ 707/103 R |
| 2006/0107252 A1* | 5/2006 | Smuga et al. ................ 717/114 |
| 2006/0190814 A1* | 8/2006 | Collie et al. ................. 715/513 |
| 2006/0288270 A1* | 12/2006 | Gaurav et al. ............... 715/506 |
| 2007/0014305 A1* | 1/2007 | Assad ........................... 370/447 |
| 2007/0106933 A1* | 5/2007 | Nene et al. .................. 715/513 |
| 2007/0150806 A1* | 6/2007 | Hartmann .................... 715/523 |
| 2007/0234210 A1* | 10/2007 | Bukovec et al. ............. 715/700 |
| 2008/0040360 A1* | 2/2008 | Meijer et al. ................. 707/100 |
| 2008/0046453 A1* | 2/2008 | Kostoulas ........... G06F 17/2247 |
| 2008/0052287 A1* | 2/2008 | Stanciu et al. ................... 707/5 |
| 2008/0104105 A1* | 5/2008 | Heifets et al. ............... 707/102 |
| 2008/0104579 A1* | 5/2008 | Hartmann .................... 717/136 |
| 2008/0162529 A1* | 7/2008 | Stuhec ......................... 707/102 |
| 2009/0132912 A1* | 5/2009 | Sulistio et al. .............. 715/236 |
| 2010/0115394 A1* | 5/2010 | Oshima et al. .............. 715/234 |

\* cited by examiner

DERIVING OVERLAY INFORMATION FROM A USER INPUT FOR A BASE MESSAGE SCHEMA ASSOCIATED WITH A NODE IN A MESSAGE FLOW

CROSS-REFERENCE TO RELATED APPLICATION

This application claims the benefit of European Patent Application No. 07150350.2 filed 21 Dec. 2007, entitled "A METHOD, APPARATUS AND COMPUTER PROGRAM FOR DERIVING OVERLAY INFORMATION FROM A USER INPUT FOR A BASE MESSAGE SCHEMA ASSOCIATED WITH A NODE IN A MESSAGE FLOW", which is assigned to the assignee of the present application, and the teachings of which are hereby incorporated by reference in their entirety.

BACKGROUND

The invention relates to message processing and more particularly to the use of schema information in the processing of a message.

It is known for business applications to use web services, messaging etc. to communicate with one another over an Enterprise Service Bus (ESB). For example, a certain class of applications may send messages to each other using messaging systems, which are connected together via the bus. In this way, one application connected to one messaging system may talk to a different application connected to another messaging system.

Applications interacting across an ESB commonly use messages such as XML messages to communicate with one another. Messages are normally described by type definitions (schema) that define the message structure and allowable content. Message type definitions may include weakly-typed fields, where the actual message contents may vary and more than one definition may apply for that part of the message. For XML messages and in some other cases, XML Schema provides the type definition, and weakly-typed fields are most commonly encountered where the "any", "anyType", or "anySimpleType" constructs are used. These are constructs that are well known in the art.

Tasks such as viewing message structure, for example, in order to define transformations between one message type and another usually depend upon a visualization of the message structure, which is derived directly from the message type definition. Visualizing the content of weakly-typed fields is difficult, because their content structure is variable, and the XML Schema or other type information does not describe the content fully. In these situations, the result is an incomplete visualization of limited assistance for defining how these messages should be handled, and the end user must often write custom logic to handle the weakly-typed content.

SUMMARY

According to first aspect, there is provided a method for deriving overlay information from a user input for a base message schema associated with a node in a message flow. The method can present the base message schema to the user. The base message schema can have at least one variable portion. A user selection of a variable portion of the base schema can be received. The user can be provided with possible overlay schema information for the selected variable portion. A user selection of the schema to be overlaid on the selected variable portion; can be received. The selected overlay schema can be associated with the base schema.

In one embodiment, an overlay instruction can be generated that contains information for locating the selected variable portion. In one embodiment, the overlay schema can be associated with the overlay instruction. In one embodiment, a message structure can be visualized by providing an amalgamated view of the base message schema and any defined overlay schemas. In one embodiment, a second message structure is visualized and the two message structures can be used to define mappings between fields in both structures. In one embodiment, a connection between a first node in the message flow and a second node can be permitted based on one or more schema propagation rules. In one embodiment, the two nodes can have the same base schema associated therewith and the rules can assert that connection is acceptable if only the first node (and not the second node) has an overlay schema associated therewith.

According to a second aspect, an apparatus can be provided for deriving overlay information from a user input for a base message schema associated with a node in a message flow. The apparatus can include a means for presenting the base message schema to the user. The base message schema can have at least one variable portion. The apparatus can include a means for receiving a user selection of a variable portion of the base schema, a means for providing the user with possible overlay schema information for the selected variable portion, a means for receiving a user selection of the schema to be overlaid on the selected variable portion, and a means for associating the selected overlay schema with the base schema.

According to a third aspect, a computer program can be provided that includes a program code means adapted to perform the method of the first aspect when said program is run on a computer. The computer program can be stored in a storage medium, such as a volatile or non-volatile memory.

DETAILED DESCRIPTION

Figure 1:
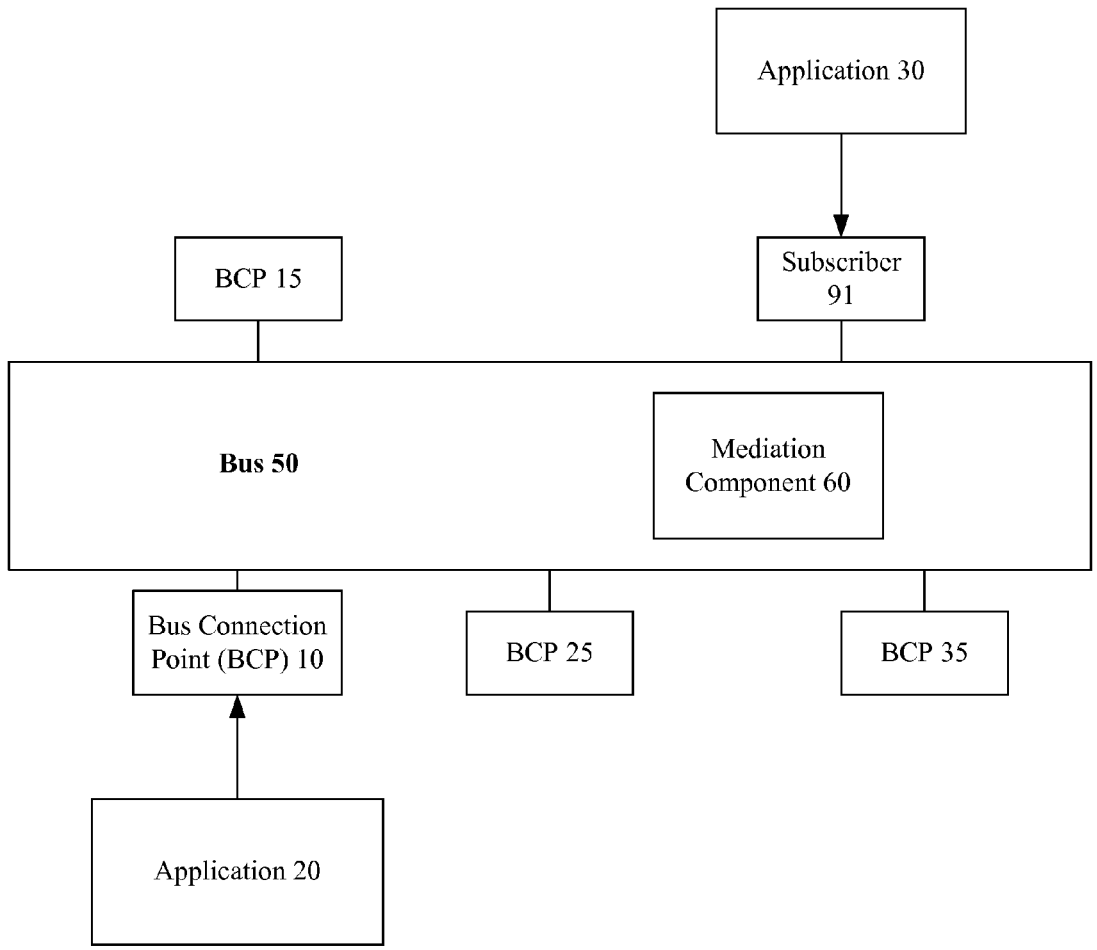
FIG. 1 illustrates a exemplary overview of the system of the present invention, in accordance with a preferred embodiment.

FIG. 1 illustrates an overview of an exemplary Enterprise Service Bus. A bus 50 is provided to connect applications 20, 30 together. Such applications 20, 30 connect into the bus using Bus Connection Points (BCP). Various BCPs 15, 25, 35, 40 are provided for this reason. By way of example only, the BCPs may be messaging system (e.g. IBM® WebSphere® MQ) queues or web services endpoints. The bus itself may include mediation logic 60. A mediation may be used to process a message that is travelling along the bus.

For example, a mediation may transform and/or log a message. (IBM and WebSphere are trademarks of International Business Machines Corporation in the United States, other countries, or both.)

Figure 2:
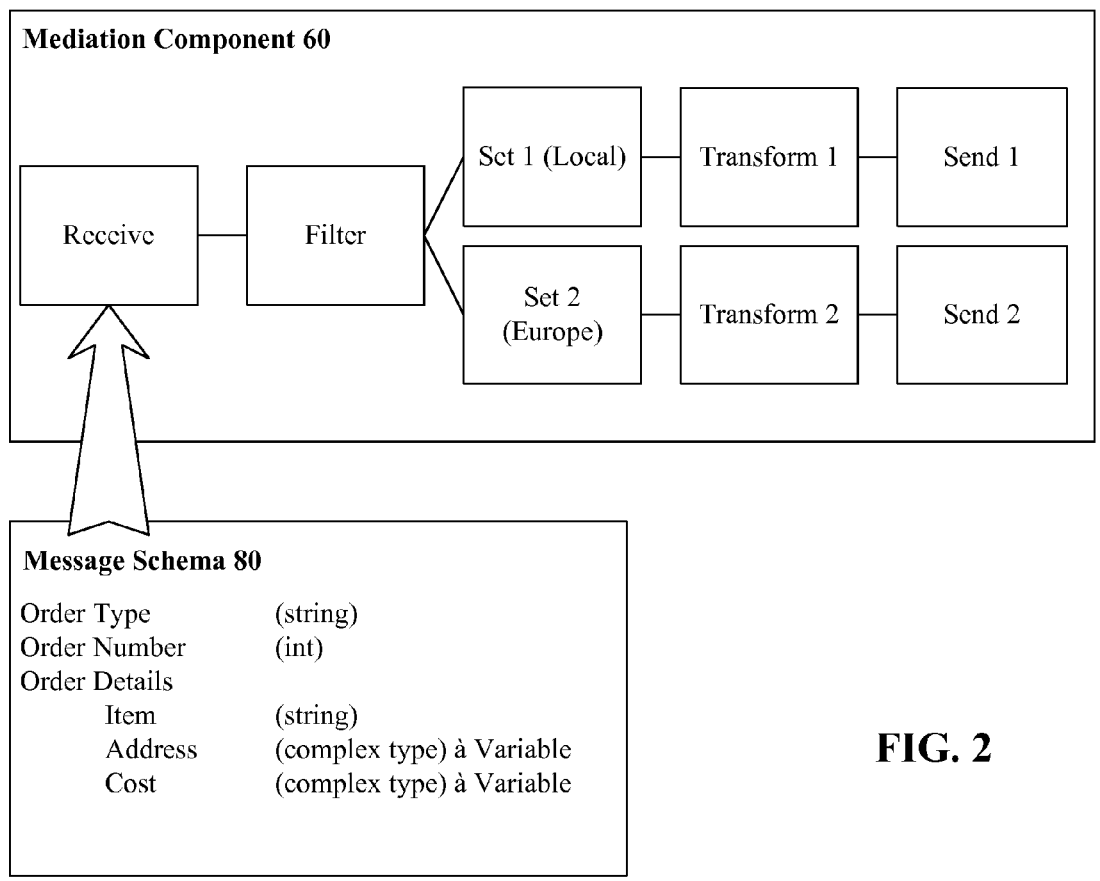
FIG. 2 illustrates the mediation component in more detail, in accordance with a preferred embodiment of the present invention.

FIG. 2 illustrates, in accordance with an embodiment of the present invention, the mediation component 60 in more detail. Mediation component 60 comprises a set of nodes. In the figure, a receive node can be provided to receive a message. A filter node can also be provided to determine which type of processing a message should undergo. For example, messages on the bus may relate to local and European orders. A local order will be processed by branch 1 and this includes a set 1 node, a transform 1 node and a send 1 node. A European order will instead be processed by branch 2. This comprises a set 2 node, a transform 2 node and a send 2 node.

Each node has input and output terminals (not illustrated). Each terminal has message schema information associated with it. An input terminal's schema information defines the format of messages received by the terminal's node, while an output terminal's schema information defines the format of messages sent by the terminal's node.

As discussed previously, such schema information may be weakly typed. In other words, a schema may not fully define the format of a message. Such a format may depend upon the processing route taken by a message. For example, a local order message may need to look different to a European order message.

In the example of FIG. 2, the input and output terminals of the receive node have message schema 80 associated with them. Message schema 80 indicates that messages received by the receive node will be order messages. They will contain an order type (string). This will indicate whether the order is a local order or a European order. Each order will have an integer order number and some order details. The order details can include the item (string), a shipping address (complex type) and a cost (complex type). It will be noticed that both the shipping address and the cost information may vary. For example, if the order is a local order, then the address may include number, street, town, county and postcode. However, for a European order, the address may be in a completely different format and will also include country information. With respect to the cost field, a local order will be in a local currency such as GBP or USD, while a European order will use Euros.

Figure 6A:
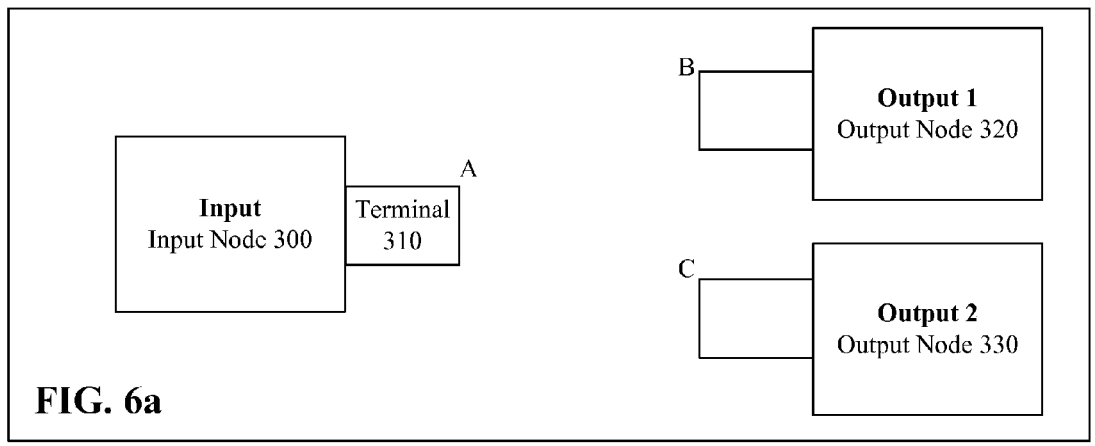
FIGS. 6*a* to 6*f* show, in accordance with a preferred embodiment of the present invention, how schema (type) information is propagated through a message work flow.

The nodes in a mediation constitute a message flow which a user designs visually on a blank canvas. When a flow is first created, its input and output nodes (e.g. receive and send nodes of FIG. 2) are provided and the terminals of these nodes carry type (schema) information. Such information is taken from interfaces and references defined on the mediation component. FIG. 6a shows input node 300 and output nodes 320, 330. Terminals are denoted by smaller square boxes (e.g. 310). In the figure, terminal types are marked A, B and C for simplicity. These signify the type of message expected to flow down associated branches of the flow.

Figure 6B:
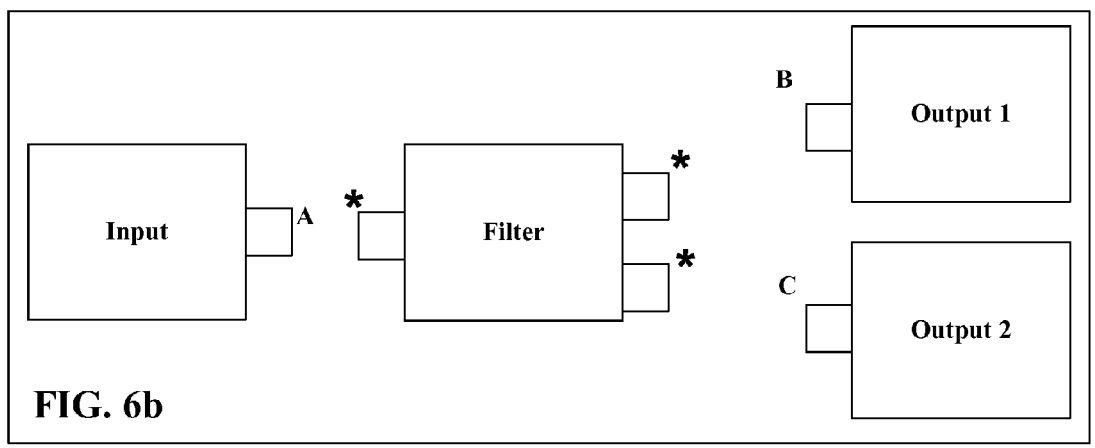

As shown in FIG. 6b, when a new node (Filter node) is dropped onto the canvas, its terminals are initially untyped. For explanatory purposes, these are marked with a *.

Figure 6C:
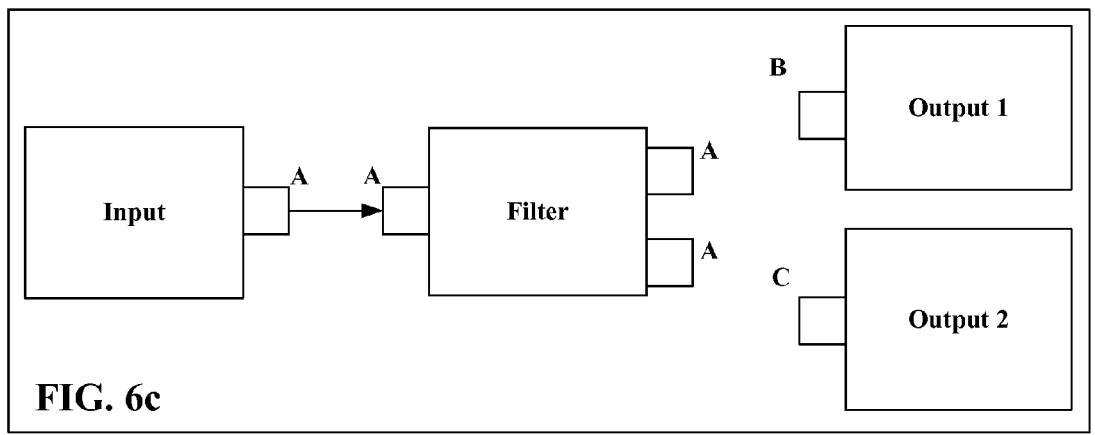

In FIG. 6c, the input and filter nodes are wired together. As wiring is added, the terminal type information propagates down the wires, 'filling in' the untyped terminals. For nodes that do not change the message type, terminal typing information propagates across them, as with the Filter node shown in FIG. 6c. Here, its terminals all acquire type A from the input node.

Figure 6D:
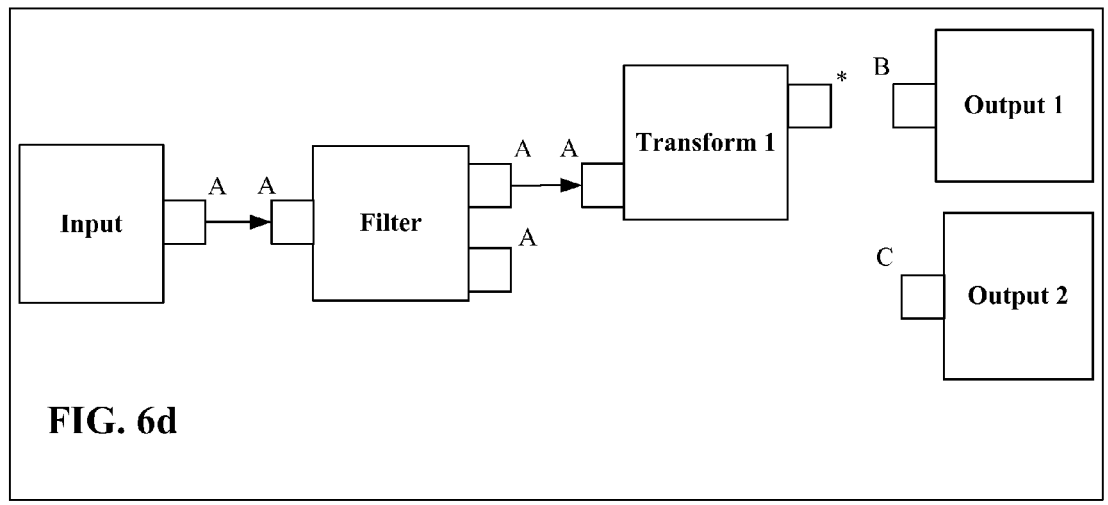

As shown in FIG. 6d, for nodes that change the message type, schema information does not propagate across them. Thus, the input terminal for the transform node receives type A information but this is not propagated to its output terminal. This remains untyped (*), even when its input terminal is wired up.

Figure 6E:
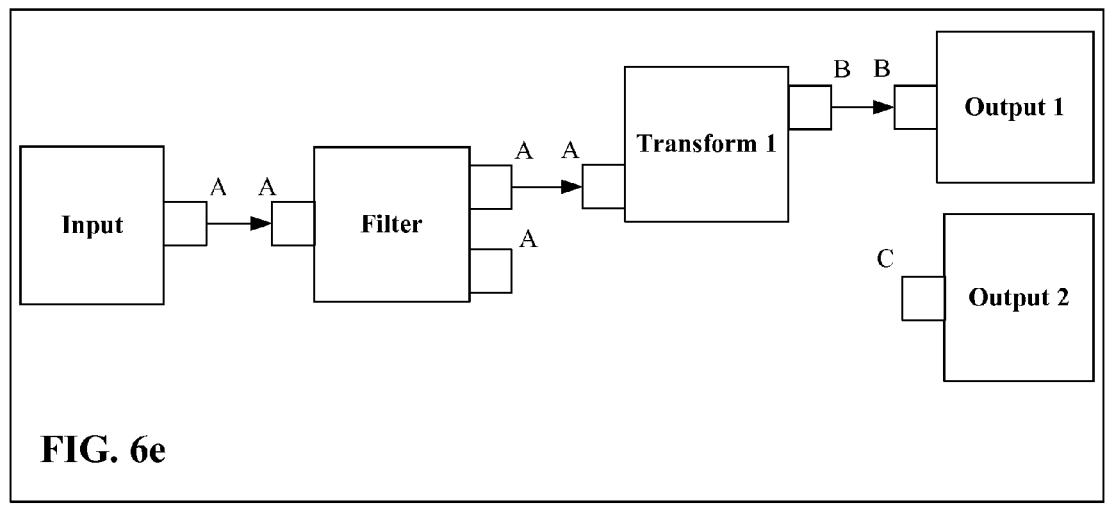

Propagation also works in the reverse direction. When the output of the transform node is wired to the output node, the transform nodes output terminal receives type information from the output nodes output terminal. This is shown in FIG. 6e.

Figure 6F:
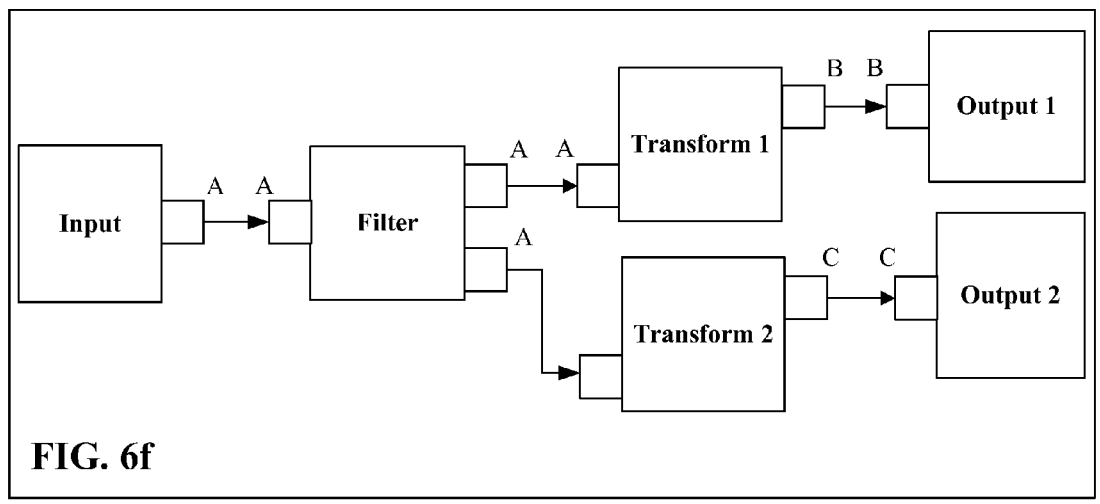

FIG. 6f completes the picture, with typing information propagating from the filter node to the transform 2 node and from the output 2 node to the transform 2 node.

In this way type or schema information propagates through a message workflow. To clarify, if two transform nodes (or other nodes which change the type information) are placed in succession, then the type is known based on the configuration of those nodes. For example, once a transformation has been configured, then the input and output message types are known.

Figure 3:
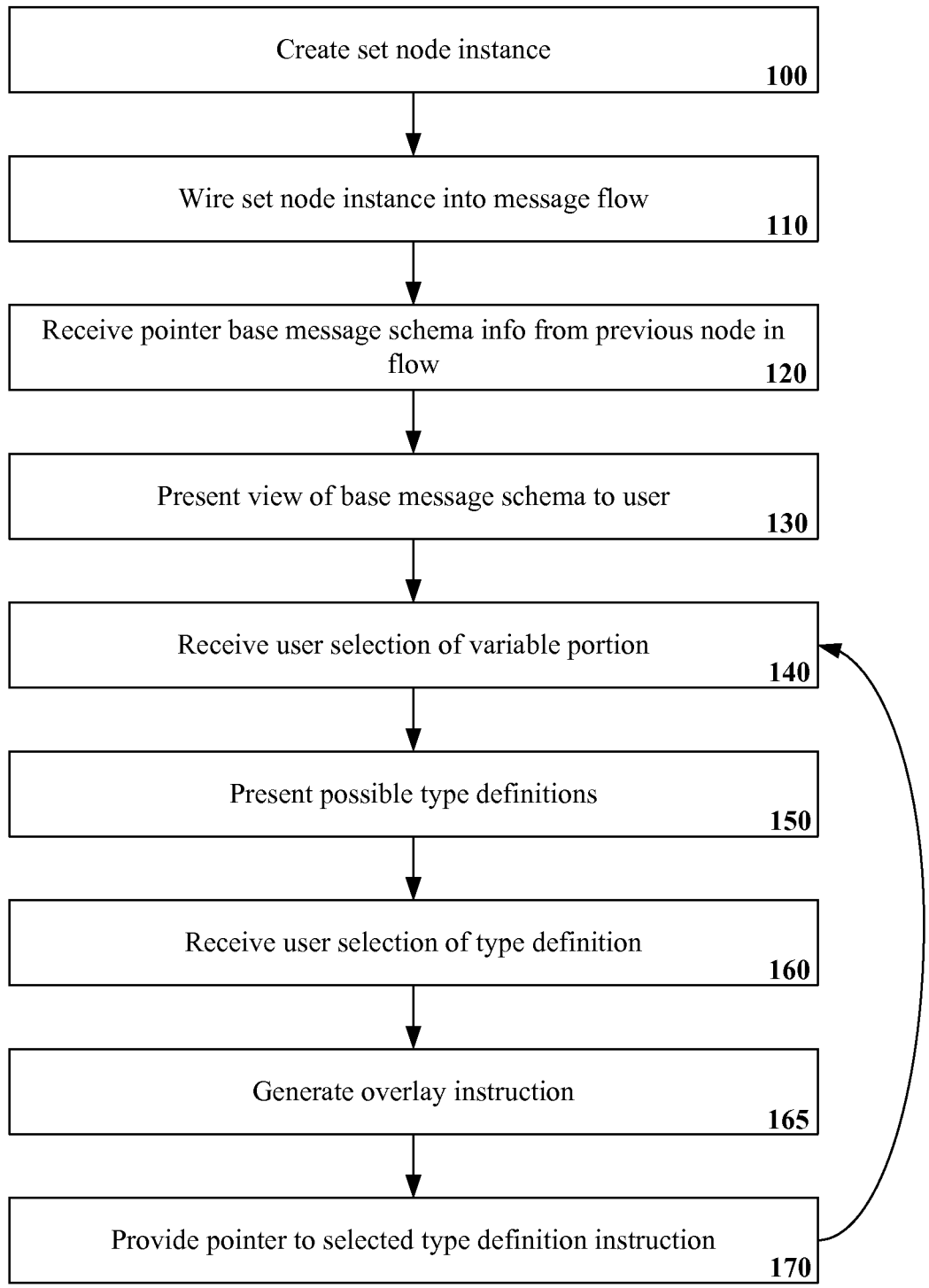
FIGS. 3 and 5 show, in accordance with a preferred embodiment, the processing of the present invention.

As previously mentioned, schema information may contain portions which vary dependent upon the specific type of message. A new type of node, the SET node, is defined which allows a user to manipulate variable schema information. This is discussed with reference to FIGS. 2 and 3. A set node instance is created at step 100 and is wired into the message flow at step 110. As shown in FIG. 2, a set node is wired in between the filter node and a transform 1 node.

At step 120, the input terminal of the set node instance receives schema information from the previous node in the message flow. This is as discussed above. It should be clarified however that the schema information is preferably not actually sent between terminals but rather a pointer enabling access to such information. This provides for a more robust solution as will be explained later on. Thus at step 120 a pointer to the base message schema is received.

At step 130, the user is presented with a graphical view of the base schema. Mechanisms for achieving this are already known in the art and so will not be discussed in any detail below.

Such a base schema may include variable portions as discussed above. The user is permitted to select a variable portion in order to overlay that portion with specific schema definition information. The mediation component stores possible schema (type) definitions from which the user may select and presents these at step 150. At step 160, the mediation component receives the user's type definition selection. At step 165, an overlay instruction is generated which indicates which element within the base schema is to be overlaid. At step 170, a pointer is provided to the selected type definition which is to be used as the overlay. Processing loops round for all variable portions within the base schema.

Figure 4:
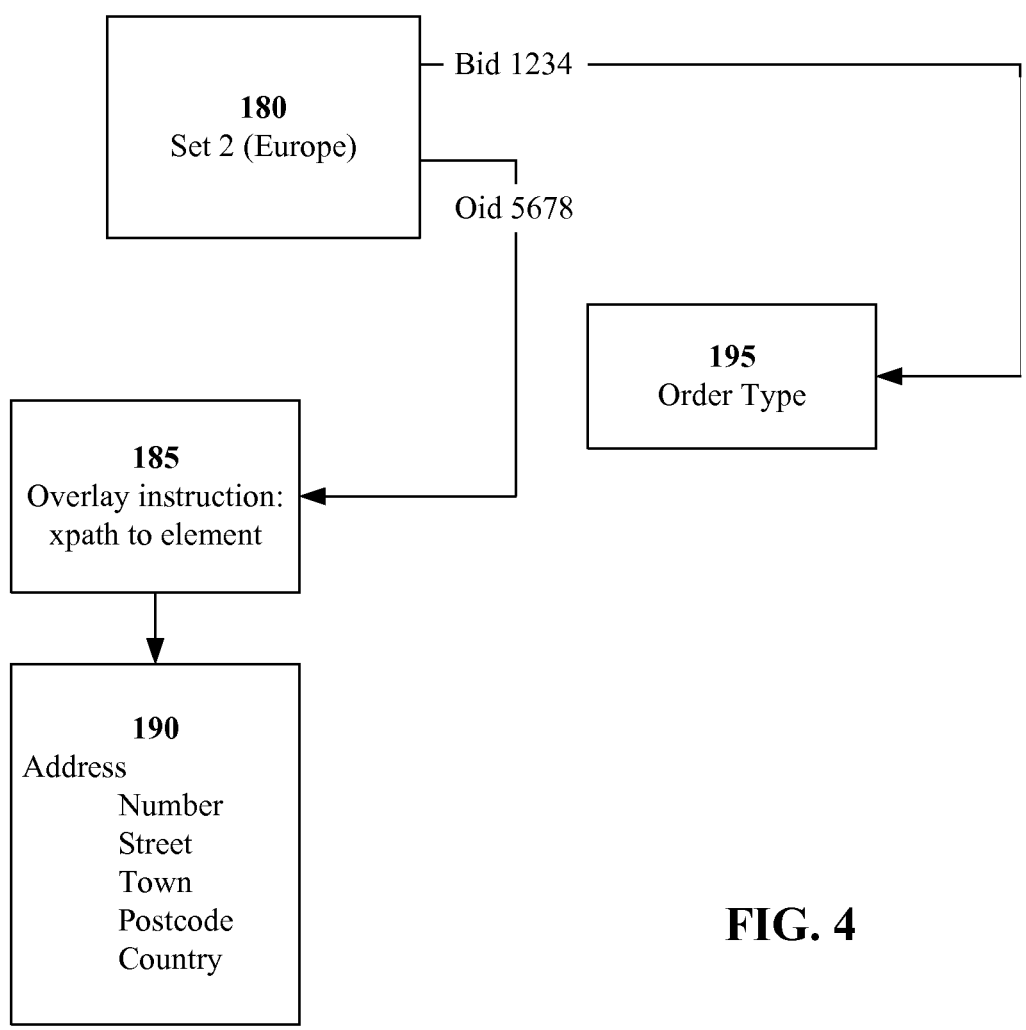
FIG. 4 show, in accordance with a preferred embodiment of the present invention, the information associated with a set node.

FIG. 4 illustrates the pointers that are thereby associated with a set node's (180) output terminal. The set node has a base id (Bid) pointer which points to the base schema in local storage. In this instance, the base schema 195 provides the base information that defines all message orders received by the mediation component.

The set node 180, also has an overlay id (Oid) associated with it. This points to an instruction 185 in storage which provides an instruction for locating the element (variable portion) within the base schema that is to be overlaid and the instruction for overlaying this portion. Note that the element may be located using an XPath expression.

The overlay instruction in turn points to the information 190 that is to be overlaid. In this instance the order is a European order and so the address information includes country information.

Thus, the output terminal of the set node now has all the information necessary to more specifically define messages received. Such type information is propagated along the message flow as previously discussed. The propagation is a 'tooling-time' propagation. The tooling needs to be told precisely what to expect at a certain point in the flow so that when the message representation is shown it has the correct form.

Whether base and overlay schema information is permitted to be propagated is defined by some validation rules. When wiring two terminals together (connecting an arc between them) that do not have the same type map (i.e. they have a type mapping of their own, either because they are part of a dataflow node that asserts a type mapping or because they are connected to a dataflow node that asserts a type mapping), connection is either allowed or disallowed according to the following rules;

1. An arc can be connected from an output terminal with base and overlay schemas (a strong type definition) to an input terminal with only a base schema (weak type definition); i.e. an input terminal with only a base schema can accept input from an output terminal with additional overlay information (because it is guaranteed that the message will conform to the base schema if it already conforms to the stronger type definition). It should be appreciated that both the base schemas should be the same.
2. An arc cannot be connected from an output terminal with a weaker type definition to an input terminal with a stronger type definition. This is because a weakly typed output terminal may produce an output that does not conform to the specific stronger type.

Having more strongly defined the schema (type) information, it is now possible to use such information to visualize the contents of a message or to define the mappings required when transforming between two message types.

Figure 5:
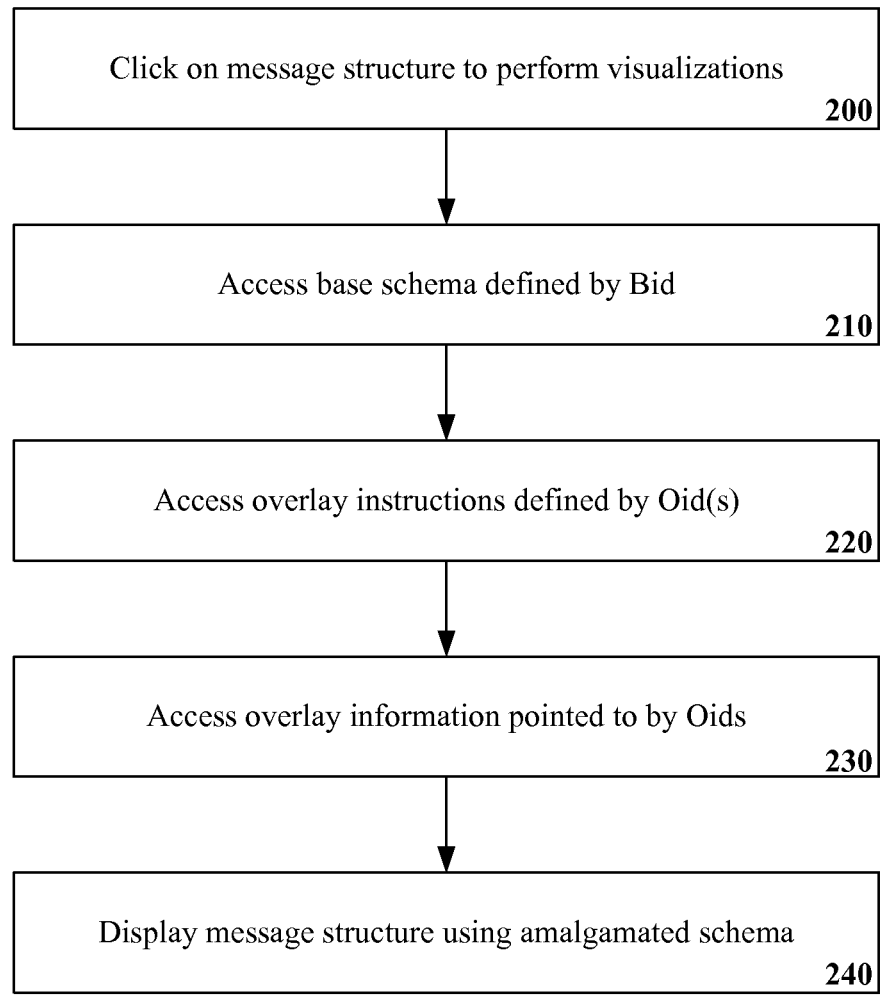

When visualizing a message, the current node's input terminal's message schema is typically used to render the message appropriately. (For a mapping (transformation) visualization is performed of both input and output message structures, based upon the input and output terminal information respectively.) This is discussed in more detail with reference to FIG. 5. At step 200, a message structure is selected on which to perform visualization. At step 210, the base schema is accessed using the Bid pointer. At step 220, the overlay instruction(s) defined for the base schema at this particular node is accessed using the Oid pointer. The overlay information subsequently pointed to is then accessed at step 230. Finally, at step 240 the selected message structure is displayed using the amalgamated schema information.

The base schema, overlay instruction and overlay information are however stored separately as discussed and do not need to be amalgamated even when the internal structure of the base or overlay type is modified. That is, although what looks like an amalgamated view of the overall message structure is produced, that view will automatically reflect any changes made to its constituent parts.

It should be appreciated that a new schema is not actually created. Rather, the message in accordance with a virtual view of an underlying message schema is presented. This provides for a much more robust solution since the parts of the schema can be individually edited. If a new schema was actually created, then it would not be possible to edit the constituent parts without the overall schema becoming out of date.

It should further be appreciated that it is optionally possible to validate messages at runtime to determine whether they conform to the amalgamated 'virtual view' of the underlying schema. For validation it is the input schema that is used.

What is claimed is:

1. A method for deriving overlay information from a user input for a base message schema associated with a first node in a message flow, wherein the base message scheme defines a format of messages for a first terminal the first node, the method comprising:
    presenting a base message schema to a user, the base message schema having a variable portion, wherein the variable portion comprises a weakly typed field having a content structure that is variable so that the base message schema does not describe an underlying message structure fully enough to enable a second terminal of a second node to interact with a first terminal of the first node of the message flow;
    receiving a user selection of the variable portion of the base message schema;
    providing the user with possible overlay schema information for the variable portion;
    receiving a user selection of the possible overlay schema to be overlaid on the variable portion, wherein the user selection provides definitional information for the weakly typed field; and
    associating the user selection, referred to as an overlay schema, with the base message schema; and
    communicating a message between the first and second nodes per the message flow in accordance with the base message schema using the user selection to further describe the weakly type field enabling the second terminal of the second node to interact with the first terminal of the first node.

2. The method of claim 1, wherein the step of associating the user selection with base message schema comprises: generating an overlay instruction containing information for locating the variable portion.

3. The method of claim 2, wherein the step of associating the user selection comprises: associating the overlay schema with the overlay instruction.

4. The method of claim 1, comprising: visualizing a message structure by providing an amalgamated view of the base message schema and any defined overlay schemas.

5. The method of claim 4 comprising:
    visualizing a second message structure; and
    using the message structure and the second message structure to define mappings between fields in both of the message structures.

6. The method of claim 1 comprising: permitting a connection between the first node in the message flow and the second node based on one or more schema propagation rules.

7. The method of claim 6, wherein the first node and the second node have base message schemas associated therewith, the schema propagation rules asserting that connection is acceptable if only the first node has the overlay schema associated therewith.

8. Apparatus for deriving overlay information from a user input for a base message schema associated with a first node in a message flow, ,wherein the base message scheme defines a format of messages for a first terminal the first node, the apparatus comprising hardware operable to execute a computer program stored on a non-transitory storage medium to:

present a base message schema to a user, the base message schema having a variable portion, wherein the variable portion comprises a weakly typed field having a content structure that is variable so that the base message schema does not describe an underlying message structure fully enough to enable a second terminal of a second node to interact with a first terminal of the first node of the message flow;

receive a user selection of the variable portion of the base message schema;

provide the user with possible overlay schema information for the variable portion;

receive a user selection of the possible overlay schema to be overlaid on the selected variable portion, wherein the user selection provides definitional information for the weakly typed field; and associate the user selection, referred to as an overlay schema, with the base schema; and communicate a message between the first and second nodes per the message flow in accordance with the base message schema using the user selection to further describe the weakly type field enabling the second terminal of the second node to interact with the first terminal of the first node.

9. The apparatus of claim 8, wherein the apparatus associates the overlay schema with base message schema by:
generating an overlay instruction containing information for locating the variable portion.

10. The apparatus of claim 9, wherein the apparatus associates the overlay schema by:
associating the overlay schema with the overlay instruction.

11. The apparatus of claim 8, wherein the apparatus is operable to: visualize a message structure by providing an amalgamated view of the base message schema and any defined overlay schemas.

12. The apparatus of claim 11, wherein the apparatus is operable to:
visualize a second message structure;
use the message structure and the second message structure to define mappings between fields in both of the message structures.

13. The apparatus of claim 8, wherein the apparatus is operable to:
permit a connection between the first node in the message flow and the second node based on one or more schema propagation rules.

14. The apparatus of claim 13, wherein the first node and the second node have base message schemas associated therewith, the schema propagation rules asserting that connection is acceptable if only the first node has the overlay schema associated therewith.

15. A computer program comprising program code stored in a non-transitory storage medium configured to cause a machine executing the computer program to:

present a base message schema to a user, the base message schema having a variable portion, wherein the variable portion comprises a weakly typed field having a content structure that is variable so that the base message schema does not describe an underlying message structure fully enough to enable a second terminal of a second node to interact with a first terminal of the first node of the message flow;

receive a user selection of the variable portion of the base message schema;

provide the user with possible overlay schema information for the variable portion;

receive a user selection of the possible overlay schema to be overlaid on the variable portion, wherein the user selection provides definitional information for the weakly typed field;

associate the selected user selection, referred to as an overlay schema, with the base message schema; and communicate a message between the first and second nodes per the message flow in accordance with the base message schema using the user selection to further describe the weakly type field enabling the second terminal of the second node to interact with the first terminal of the first node.

16. The method of claim 1, wherein the base message schema and the overlay schema are XML schemas.

17. The method of claim 1, wherein the base message schema does not fully define a format of a related message, wherein the format is dependent upon the processing route taken by the message.

18. The method of claim 1, further comprising:
a user constituting the message flow via a visual design tool for creating message flows; and
combining multiple nodes to each other via the visual design tool, each node having an associated schema, wherein the said base message schema is a schema of one of the multiple nodes.

19. The method of claim 1, wherein the base message schema is an XML schemas, and wherein the variable portion comprises at least one weakly-typed fields that use one of an "any", "anyType", or "anySimpleType" construct.

* * * * *